Oct. 8, 1968 L. E. WEST 3,405,234

TONE CIRCUITS FOR CONTROL AND DATA SIGNALS

Filed Dec. 30, 1965 4 Sheets-Sheet 1

INVENTOR.
L. ELWOOD WEST
BY D. Kendall Cooper
ATTORNEY.

TONE CIRCUITS FOR CONTROL AND DATA SIGNALS

Filed Dec. 30, 1965

United States Patent Office 3,405,234
Patented Oct. 8, 1968

3,405,234

TONE CIRCUITS FOR CONTROL AND DATA SIGNALS

Lloyd Elwood West, Lexington, Ky., assignor to International Business Machines Corporation, Armonk, N.Y., a corporation of New York

Filed Dec. 30, 1965, Ser. No. 517,653
23 Claims. (Cl. 178—66)

This invention relates to signal processing circuits and more particularly to circuit and system arrangements for handling control signals and data signals represented by tones of various frequencies.

The tone circuits of the present invention are disclosed in connection with (1) a dictation system wherein the circuits are primarily directed to handling control functions and (2) a data communication system wherein comparable tone circuits are responsive to data signals represented by discrete frequencies.

Prior art systems predicated on the generation and recognition of tone signals have usually relied on circuits that are uniquely and particularly designed for each tone signal encountered in the system. As an example, in one prior art system, a number of tuned circuits, each preadjusted to recognize a particular tone frequency, is provided in sufficient number to accommodate all signals required. Each circuit responds only to a particular frequency and upon occurrence of a signal having that frequency, supplies a significant output indication. Usually, the output indication is in the form of a direct current (D.C.) level and the circuits are conveniently known as tone to D.C. converters. In other prior art arrangements, individual single shots related to each tone that may be encountered, are provided in the system, each single shot having a related integrator circuit. The time period of the single shot, when fired, is related to its tone in such a manner that the single shot supplies a predetermined D.C. level to the integrator circuit when the proper tone is recognized. Numerous other tone generation and recognition circuits have been developed, with varying degrees of complexity.

Accordingly, an object of the invention is to provide simplified tone circuits for handling control and data signals.

A further object of the invention is to provide basic tone circuits that are versatile and highly flexible, and that may be arranged in a diversity of logical circuit arrangements in order to handle a wide range of tone signal requirements.

Another object of the present invention is to provide universal tone circuits that lend themselves to handling a large number of tone frequencies, or a restricted range of frequencies, as required.

Also, an object of the invention is to provide tone oriented systems with improved D.C. to tone and tone to D.C. converter circuits.

Still another object of the invention is to provide intelligence systems for processing discrete control or data signals wherein tone signals are converted to and from logical signal levels representative of such control and data signals.

Still another object of the present invention is to provide intelligence communication systems wherein a plurality of tone logical indications are supplied in accordance with logical gating arrangements.

A still further object of the invention is to provide tone circuits for concurrently providing discrete intelligence representing manifestations as well as system monitoring and malfunction indications.

In order to accomplish these and other objects of the invention unique tone circuits based on the principles of the present invention are adaptable to the processing of a plurality of single frequencies representative of control functions required in a system, and are also adaptable for the handling of data signals represented by discrete frequencies as well as signal monitoring purposes. In one embodiment according to the present invention, a dictating system is arranged for control of actions of a central recording apparatus by any one of a plurality of remote dictating stations. Tones generated at a remote station are converted to and from logical levels via means of various tone circuits. At least some of the tone recognition circuits are arranged with interconnecting gating networks so that a discrete control level may be obtained for each tone generated, or a plurality of control levels for each tone generated, as required.

The principles of tone generation and recognition are further disclosed in connection with a data communication environment wherein digital data signals are represented by discrete tone frequencies with the conversion of tones to and from logical levels and wherein provision is made for restricting tone recognition to a predetermined frequency range, with an absence of signals or signal frequencies outside the predetermined range resulting in various monitoring indications. While the control aspects are taught in connection with one system environment, and the data signal aspects in connection with another system environment, a combined system having both characteristics may be readily derived from the principles disclosed.

The foregoing and other objects, features, and advantages of the invention will be apparent from the following more particular description of the various embodiments of the invention as illustrated in the accompanying drawings.

Figure 5A:
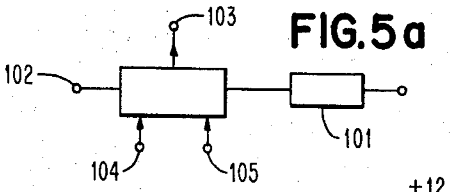
Figure 5B:
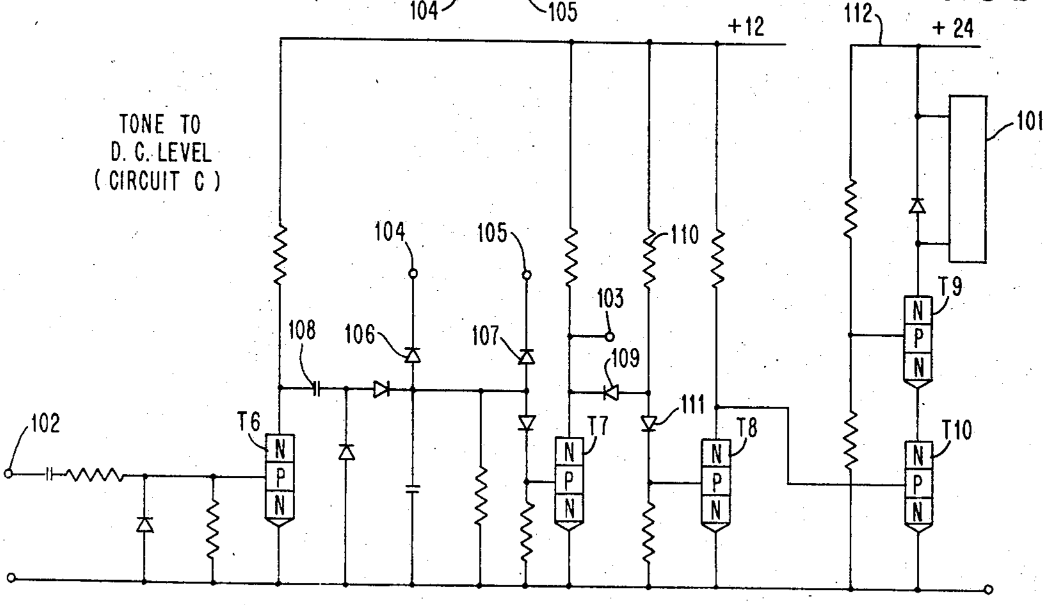

FIG. *5a* is a block diagram of FIG. 5B which is an expanded tone to D.C. level circuit with selective gating networks.

Figure 1:
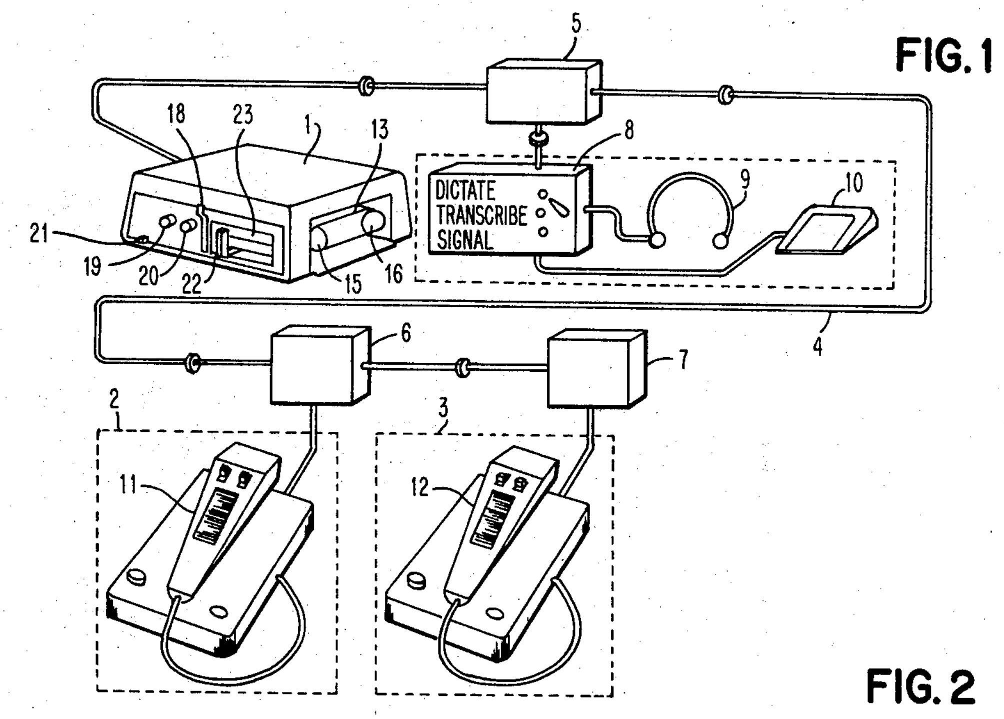
FIG. 1 represents a dictating system wherein a central recording apparatus has tone circuits responsive to tone signals generated at remote microphone stations.
Figures 6, 7:
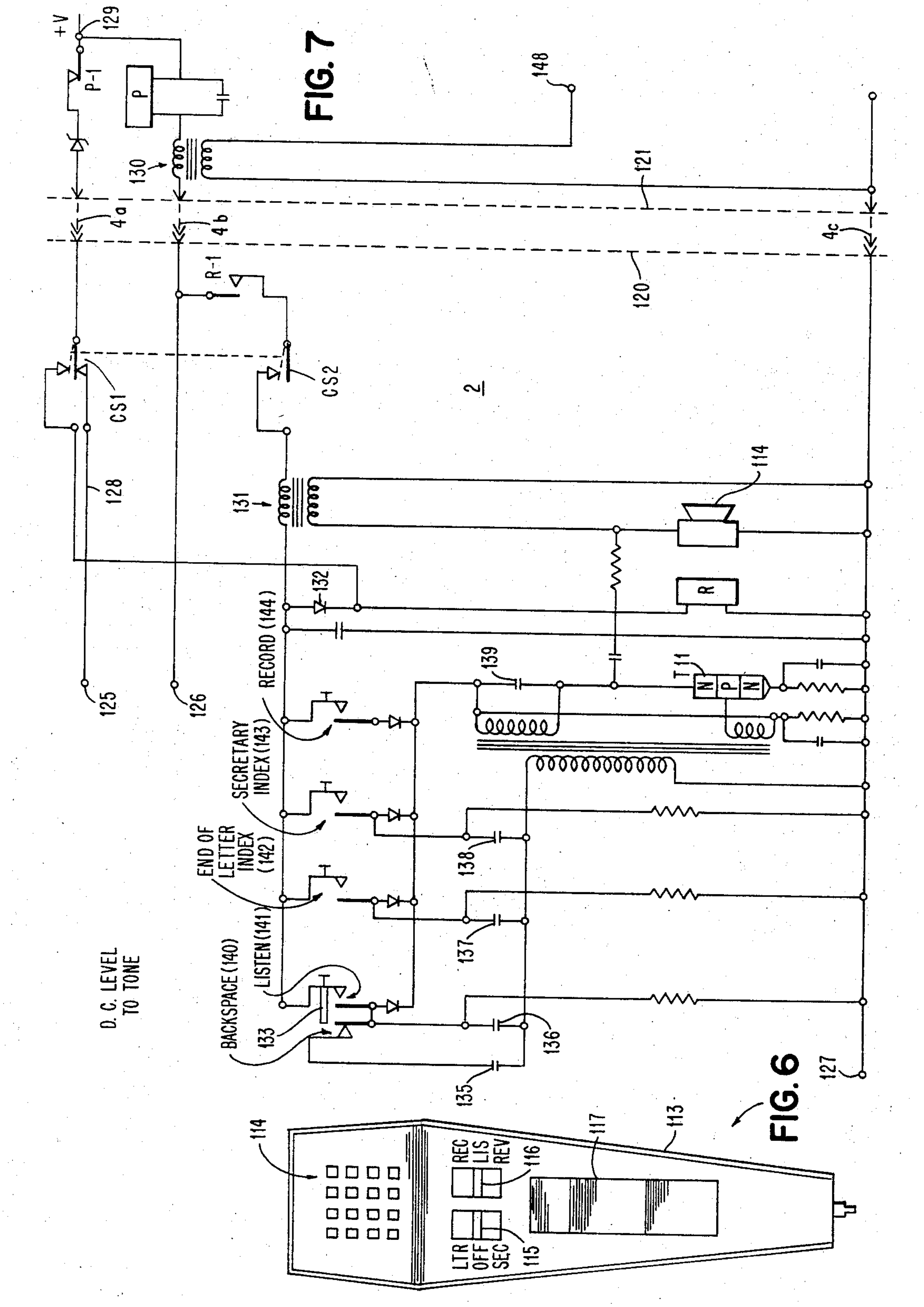

FIG. 6 represents a combined microphone-control handset that is useful in the system of FIG. 1.

FIG. 7 shows seizure circuits and D.C. level to tone generating circuits that are used in the system of FIG. 1.

Figures 8, 9, 9A:
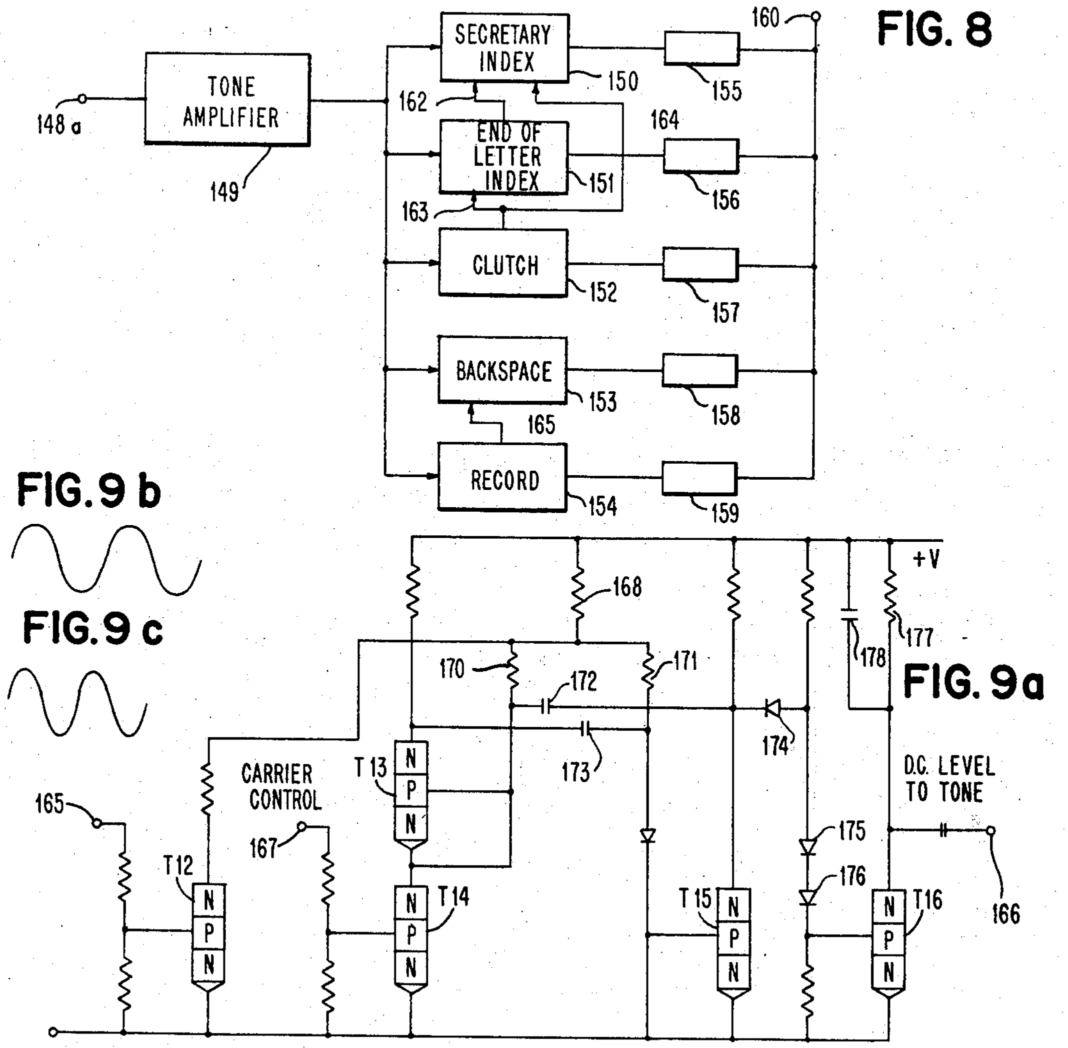

FIG. 8 represents an arrangement of gated tone circuits like that of FIG. *5b* for use in the central dictation apparatus in FIG. 1.

Figure 2:
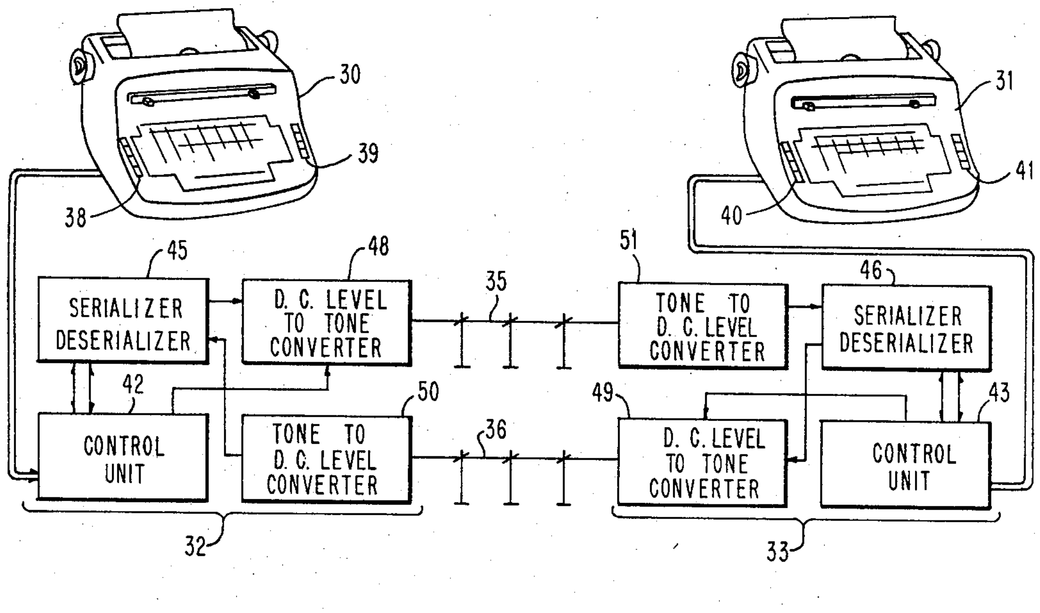
FIG. 2 shows a communication system for transmitting data from one terminal to another terminal and having provision for converting tone signals to and from D.C. levels.

FIG. *9a* is a D.C. level to tone circuit that is particularly useful in the system of FIG. 2, with representative tone outputs shown in FIGS. *9b* and *9c*.

Figure 10:
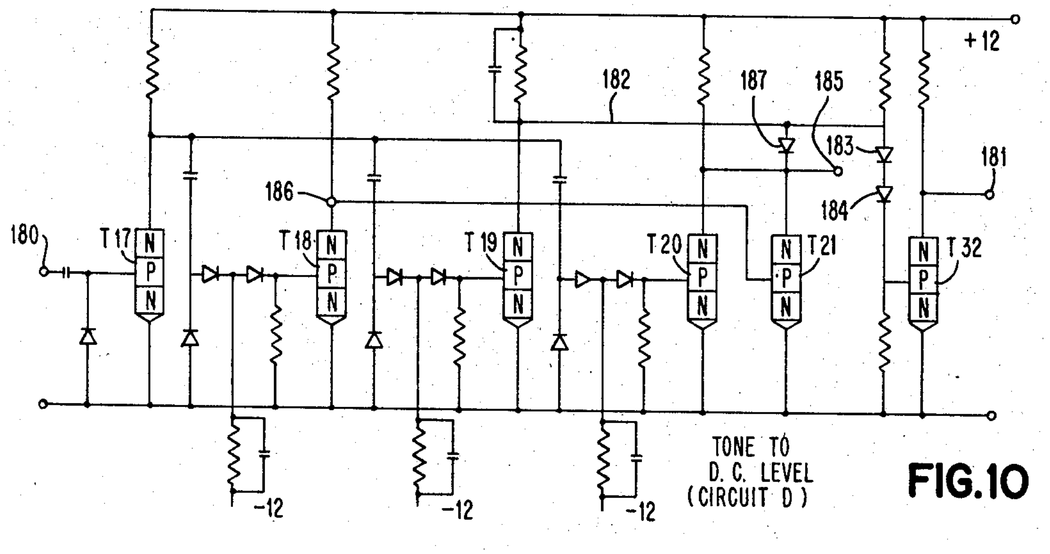

FIG. 10 is a tone to D.C. level circuit useful in the system of FIG. 2 and responsive to signals generated by the circuit of FIG. *9a*.

*Tone controlled dictation system-general description*

The dictation system, FIG. 1, has a central dictation recording and reproducing apparatus 1 that is interconnected with remote microphone stations 2 and 3 by a direct wire hookup 4. A number of junction boxes 5, 6, and 7 serve as additional connectors in the system. A control unit 8, located at the central station controls the mode of the system and has three mode settings designated "Dictate," "Transcribe" and "Signal." When in the Dictate mode, the central recorder 1 is available to either of the remote stations 2 or 3 for recording and reproducing dictated material. When in the Transcribe mode, a head set 9 and foot control 10 are connected to the dictation apparatus 1 so that previously dictated material may be transcribed, as by preparation of a typewritten draft. The Signal mode prepares circuits so that the central station attendant is notified by a buzzer or light indication when a remote station has terminated its dictation. The system of FIG. 1 is comparable to the dictation recording system disclosed in U.S. patent application Ser. No. 216,261, entitled "Multiple Station Selection System" with N. J. Albanes and M. P. Langendorf as inventors, filed Aug. 10, 1962, now Patent No. 3,222,460, and assigned to the same assignee as the present invention. In the Albanes et al. system, seizure, switching, and control functions are accomplished by transmission of appropriate D.C. levels over communication line 4. For the purpose of illustrating the present invention, the circuits have been modified to the extent that the various control functions required in operating the central dictation apparatus 1 are effected by circuits that are responsive to tone signals in the audio range generated by appropriate manipulation of control buttons provided on microphones 11 and 12 at stations 2 and 3, respectively. A detailed representation of a microphone that is like microphones 11 and 12 is shown in FIG. 6.

For general information, the dictation apparatus 1 records and reproduces signals derived from a magnetic record media, such as a magnetic belt 13, that is mounted for movement on supporting mandrels 15 and 16, and that is scanned by a magnetic head, not shown. A belt release lever 18 is provided to permit loading and unloading of belts. Dictation apparatus 1 also has a volume control 19 that is useful in controlling volume levels during playback, a tuning control 20 that is used to insure proper tracking of the magnetic head in relation to recorded tracks on belt 13, and a speed control 21 for controlling the speed of belt 13 during transcription. An index assembly 22 is provided for perforating an index slip 23 with Secretary (Sec.) instruction perforations or End of Letter (LTR) perforations as dictation progresses.

A detailed description of the system of FIG. 1 and its operation will be made hereinafter in connection with FIGS. 6, 7, and 8.

*Data communication system-general description*

The data communication system, FIG. 2, includes two printers 30 and 31 that are interconnected through transmitting and receiving circuits 32 and 33 by way of duplex lines 35 and 36. The system of FIG. 2 is arranged for transmission of bits of information representative of characters such as functional characters or informational characters from printer 30 to printer 31, or vice versa. Printer 30 has control buttons 38 and 39 for establishing various localized and communicating modes of operations. Printer 31 has comparable control buttons 40 and 41. Other than the circuits for converting tones to and from D.C. levels, shown in detail in FIGS. 9*a* and 10, the various components of the system of FIG. 2 are not shown in detail since the system may take any one of many well known forms. Various arrangements of circuits would prove suitable for the system of FIG. 2, but in the arrangement shown, each printer 30 and 31 has a respectively associated control unit 42 and 43 for directing the data transmitting operations.

Each printer station also has a Serializer-deserializer circuit, such as circuits 45 and 46, for supplying bits representative of characters to the transmission lines and for reassemblying bits into recognizable character bit groups as the bits are received over the communication lines.

Printers 30 and 31 may, as an example, take the form of the single element printer disclosed in U.S. Patent 2,919,002 to L. E. Palmer, entitled "Selection Mechanism for a Single Printing Element Typewriter." The printers are further modified for input/output operation as taught in U.S. Patent 3,082,854 to F. E. Becker, entitled "Typewriter Input Checking Mechanism." As an example of a possible system configuration for FIG. 2, reference is made to U.S. patent application Ser. No. 268,386, with R. A. Kolpek as inventor, entitled "Recording Apparatus," filed June 30, 1965, now Patent No. 3,253,837, and assigned to the same assignee as the present application. In the Kolpek system, digital characters representative of functional characters for controlling printer operation as well as informational characters representative of data are transmitted back and forth between terminals that are interconnected by a communication line.

The D.C. level to tone converter circuits 48 and 49, FIG. 2, are patterned after the detailed circuit arrangement of FIG. 9*a*. The tone to D.C. level converter circuits 50 and 51, FIG. 2, are like the detailed circuit of FIG. 10.

The system of FIG. 1 is predicated upon the generation and recognition of tone signals for controlling the various operations required in the dictation apparatus 1 during the recording and reproducing of audio speech signals from magnetic belt 13. The communications system of FIG. 2 is also predicated upon the generation and recognition of tone signals, but in this case the tone signals have a data bit representing significance, as contrasted with the discrete control significance used in FIG. 1 In some cases, it may be desirable to adapt the tone control arrangements, such as those in the system of FIG. 1 for use in the system of FIG. 2 concurrently with or in an intermixed fashion with the transmission of tone data bits over lines 35 and 36. As presently constituted, the system of FIG. 2 uses predetermined characters for data purposes, the individual bits of each character being represented by frequency signals having particular predetermined recognizable characteristics.

*Tone to D.C. level circuits*

Figure 3:
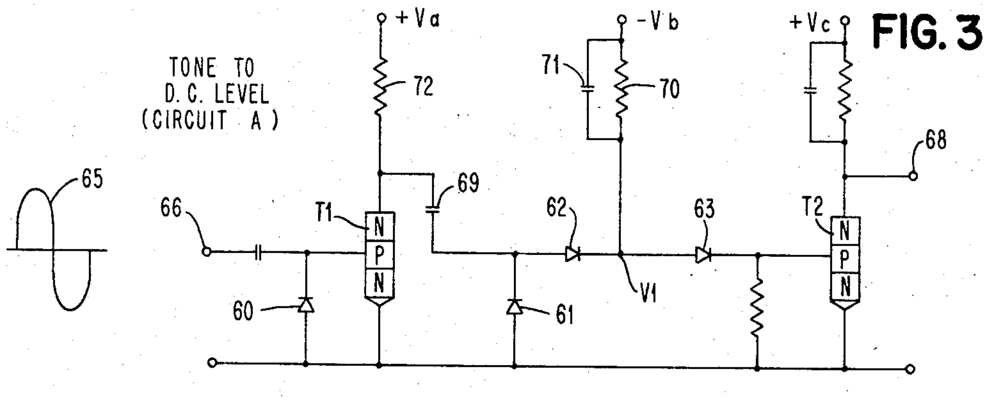
FIGS. 3 and 4 are basic tone to D.C. level circuits that are adaptable for the control functions of the system in FIG. 1 or the data transmission functions of the system in FIG. 2.

Before proceeding with detailed descriptions and operation of the systems of FIGS. 1 and 2, reference is first made to FIGS. 3, 4, 5*a* and 5*b* for a consideration of certain basic tone to D.C. level discriminating circuits that are adaptable for use in either system of FIG. 1 or FIG. 2. The functions of all of the circuits in the figures just referred to is to supply discrete D.C. levels such as zero (ground) or +12.0 volts depending upon the frequency of tones directed to their inputs. The tone to D.C. level circuit of FIG. 3 is further designated as Circuit A, the circuit of FIG. 4 as Circuit B, and the circuit of FIG. 5*b* as Circuit C. The circuit of FIG. 5*b* is readily adaptable for use in the system of FIG. 1 in arrangements particularly shown in FIG. 8. Of general interest at this point is that an additional tone to D.C. level circuit designated Circuit D, that is adaptable particularly for use in the system of FIG. 2, is shown in detail in FIG. 10.

Circuit A, FIG. 3, comprises two transistors designated T1 and T2, a number of sources of potential designated as $+Va$, $-Vb$, $+Vc$, and a number of other circuit components including diodes 60–63. Circuit A is assumed to have a generally sinusoidal tone signal, such as signal 65, applied to terminal 66. Signal 65 may vary in amplitude and/or frequency. The arrangement of elements in FIG. 3 is such that a particularly predetermined frequency of signal 65, a particular discrete D.C. level becomes available at output terminal 68. It is assumed that the output level at terminal 68 is normally at +12.0 volts. Recognition of a signal having the proper frequency at input terminal 66 results in a change in the output signal at terminal 68 from +12.0 volts to ground or zero potential. Normally, with no signal at input terminal 66, transistor T1 is nonconducting and transistor T2 is also nonconducting. When an input signal 65 is applied to terminal 66, transistor T1 tracks the signal, conducting on the positive half swings of the signal and cutting off on the negative half swings of the signal. When transistor T1 is on, that is, saturated, capacitor 69 is discharged through diode 61. When transistor T1 is not conducting, capacitor 69 is charged through diode 62 from the potential $-Vb$.

Circuit A, FIG. 3, is designed so that most of the charge current for capacitor 69 passes through the shunt combination of resistor 70 and capacitor 71. The values of resistor 70 and capacitor 71 are selected so that their time constant is large in relation to the period of the incoming sinusoidal signal 65. Accordingly, the voltage realized across resistor 70 will be the value of resistor 70 times the average charge current. The values of resistor 72 and capacitor 69 are selected so that their time constant is about ⅛ of the period of the desired incoming tone signal. Therefore, capacitor 69 is charged almost to its full capacity during the non-conducting portion of each cycle. For each cycle of the input signal 65, a charge (Q) of ΔV times (value of capacitor 69) must flow through the combination of resistor 70 and capacitor 71.

In FIG. 3 note that the charging current for capacitor 69, is identical to the current flowing through diode 62. The circuit is designed so that most of the current through diode 62 flows through the parallel combination of resistor 70 and capacitor 71. Capacitor 71 acts like a current integrator so that a D.C. current flows through resistor 70 equal to the average current flowing through diode 62. Then the voltage at terminal V1 is:

$$V1 = R70I - Vb \quad (1)$$

where I is the average current flowing through diode 62.

If ΔT is the period of one cycle of the input signal 66, and time $t_0$ the beginning of a given cycle, then:

$$I = \frac{1}{\Delta T}\int_{t_0}^{t_0+\Delta T} i_d dt \quad (2)$$

where $i_d$ is the instantaneous current through diode 62, and $dt$ is the differential of time. If the transistor T1 is assumed to be cut off the first half of each cycle, and to conduct the second half of each cycle, capacitor 69 will be discharge at time $t_0$. Vc, the voltage across capacitor 69 at the end of the first half of any cycle is given by:

$$Vc = \frac{1}{C69}\int_{t_0}^{t_0+\frac{\Delta T}{2}} i_c dt \quad (3)$$

where $i_c$ is the charging current fo C69. For the first half of any cycle $i_d = i_c$, and in the last half of any cycle $i_d = 0$. Then:

(4)

$$\int_{t_0}^{t_0+\Delta T} i_d dt = \int_{t_0}^{t_0+\frac{\Delta T}{2}} i_c dt + \int_{t_0+\frac{\Delta T}{2}}^{t_0+\Delta T} i_d dt = \int_{t_0}^{t_0+\frac{\Delta T}{2}} i_c dt$$

From 3 and 4, $$V_c C69 = \int_{t_0}^{t_0+\frac{\Delta T}{2}} i_c dt = \int_{t_0}^{t_0+\Delta T} i_d dt \quad (5)$$

By substituting 5 into 2

$$I = \frac{V_c C69}{\Delta T} \quad (6)$$

If ΔT is increased, Vc approaches a limit, ΔV. The circuit is designed with a time constant of resistor 72 and capacitor 69 that is small compared with the cycle period, ΔT. Therefore, Vc approaches the limit ΔV. Vc then is approximately equal to ΔV. From FIG. 3, $\Delta V = Va - V_{d62} - V1$.

Since ΔT is the period of one cycle of the incoming signal 66, $$\Delta T = \frac{1}{f}$$

where $f$ is the frequency of the incoming signal.

Equation 6 may be written:

$$I = \Delta V(C69)f \quad (7)$$

Equation 7 can be substituted into Equation 1:

$$V1 = R71\Delta V(C69)f - Vb \quad (8)$$

Where $f=0$, $V1 = -Vb$. As $f$ increases, V1 goes more positive. For frequencies below a certain value, $f_1$, transistor T1 cannot conduct. For frequencies above a certain value, $f_s$, V1 will be sufficient to put transistor T1 into saturation. By using a combination of such basic circuits, discrimination may be obtained between two or more tone frequencies.

The foregoing discussion indicates that the Circuit A, FIG. 3, supplies a first D.C. level, such as +12.0 volts when the applied signal 65 is below a certain frequency point and supplies a second D.C. level, such as 0 volts, when the applied signal 65 has a frequency that is above the selected frequency point. As an example, Circuit A may provide a +12.0 volt D.C. level when the applied signal 65 is below 3.0 kilocycles (kc.) and a 0 volt output when the applied signal 65 has a frequency above 3.0 kc.

Figure 4:
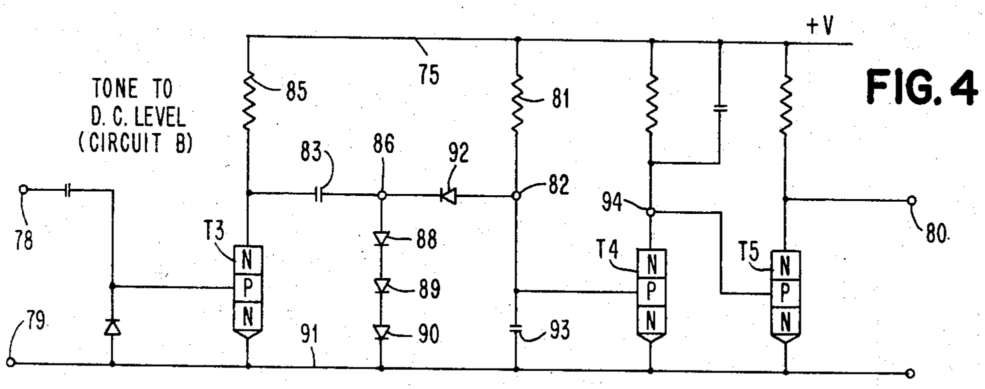

The circuit of FIG. 4, Circuit B, requires more components than Circuit A, FIG. 3, but provides somewhat better output stability. The circuit includes transistors T3, T4 and T5 with a common voltage supply, +V, on line 75. An input signal, such as signal 65, FIG. 3, is applied across terminals 78 and 79 and an output signal is derived from terminal 80. Normally, in the absence of signal, transistor T3 is cut off, transistor T4 is conducting due to bias established by resistor 81, and transistor T5 is also cut off. The potential at terminal 80 may be assumed to be +12.0 volts under these conditions. Resistor 81 sets up a bias of approximately .5 volt at terminal 82. Capacitor 83 is charged in a manner comparable to the charging of capacitor 69 in FIG. 3 through resistor 85 and under control of transistor T3 which tracks the input signal. The amount of charge on capacitor 83 depends upon the potential available through resistor 85 as well as the frequency of the applied signal. The voltage at terminal 86, generally speaking, is directly proportional to the frequency of the applied signal.

Transistor T3 conducts on positive half cycles and is non-conductive on negative half cycles of the applied tone signal. When transistor T3 is nonconducting, capacitor 83 charges through resistor 85 and through diodes 88, 89 and 90 to ground line 91. Assuming that each diode has a drop of approximately .5 volts, junction 86 will display a potential of 1.5 volts. When transistor T3 conducts, capacitor 83 discharges through diode 92 into capacitor 93. Accordingly, the charge stored in capacitor 83 is transferred to capacitor 93 and the normal .5 volt biasing potential applied to the base of transistor T4 changes to .4 volt, thereby cutting transistor T4 off. When this happens, the potential at terminal 94 becomes approximately .5 volt and transistor T5 turns on. With the turn on of transistor T5, the potential at terminal 80 drops from +12.0 volts to approximately 0 volt.

Circuit B of FIG. 4 has some compensating aspects. If the +V potential on line 75 should change, the potential at terminal 82 remains fairly constant, regardless of the change. An increase in potential on line 75, for example, will result in an increase on the charge on capacitor 83. However, the current passing though resistor 81 also increases, the potentials made available at terminal 82 for controlling transistor T4, as transistor T3 conducts and cuts off, remain accurate, and control of transistors T4 and T5 is made more stable.

The basic circuits A and B, FIGS. 3 and 4, are expanded to serve as tone discriminating circuits such as those in FIGS. *5b* and 10. The circuit of FIG. 10 will be considered in detail later in connection with the data communicating system of FIG. 2. The circuit in FIG. *5b* is designated as Circuit C and includes a number of transistors T6, T7, T8, T9 and T10 arranged for controlling the energization of a magnet 101 in a selective manner. The circuit has an input terminal 102 to which a tone signal such as signal 65, FIG. 3, is applied. The circuit is indicated in block form in FIG. *5a* with corresponding reference numeral designations. In Circuit C, FIG. *5b*, transistors T6 and T7 correspond respectively, with transistors T1 and T2, FIG. 3. Besides driving a magnet, such as magnet 101, FIG. *5b*, through transistors T8, T9 and T10, transistors T6 and T7 supply a control output at terminal 103. Circuit C also has gating control inputs at terminals 104 and 105 with associated diodes 106 and 107.

By arranging a plurality of circuits similar to Circuit C, as represented in FIGS. *5a* and *5b*, with appropriate interconnections as shown in FIG. 8, logical gating and degating of the various circuits in accordance with requirements of a particular application is achieved. The output of Circuit C at terminal 103 is comparable to the output of Circuit A at terminal 68, FIG. 3. That is, terminal 103 presents a +12.0 volt potential when a tone signal that does not have the proper frequency level is applied to input 102 and terminal 103 presents a 0 potential as transistor T7 conducts in response to application of a tone signal to terminal 102 that has a frequency at or above a predetermined frequency level. However, if either of the terminals 104 or 105 has a 0 potential applied to it, as from another tone to D.C. level circuit, comparable to Circuit C, then the circuit is degated, transistor T7 cannot conduct, and the output at terminal 103 remains at +12.0 volts. The biasing output to drive transistors T8, T9, and T10 remains unchanged and magnet 101 cannot be energized.

Application of a tone signal having a frequency at or above the predetermined level results in capacitor 108 being charged in a manner similar to the charging of capacitor 69. In the absence of degating inputs to terminals 104 and 105, transistor T7 will conduct and the collector of transistor T7 drops to ground. This causes a current flow through diode 109. Prior to the turn on of transistor T7, the primary current flow is through resistor 110 and diode 111. Transistor T8 is normally on and with the drop in potential at the collector of transistor T7, transistor T8 cuts off. This raises the potential applied to the base of transistor T10. Transistors T9 and T10 each asume approximately a +12.0 volt drop and are arranged in series to a +24.0 volt potential on line 112 to energize magnet 101.

*Detailed description and operation-dictation system, FIGURE 1*

The tone logical or tone to D.C. level circuits of FIGS. 3, 4, *5a*, and *5b* are particularly well suited for handling control signals of various frequencies and for data communications. The control aspects are first considered in connection with the detailed dictating circuits of FIGS. 7 and 8 that apply to the dictating system of FIG. 1.

Each of the remote stations 2 and 3 in FIG. 1 has an associated microphone-control handset 11 and 12. A comparable handset is designated 113, FIG. 6. Handset 113 has a transducer 114 that is used by the dictator during a recording operation and that serves as a speaker during a playback or listen operation. Handset 113 has an instruction button 115 that is movable to three positions designated Letter-Off-Secretary. The instruction button 115 is movable to the upper Letter position to effect end of Letter perforations in index slip 23, FIG. 1. Instruction button 115 is moved to the lower Secretary position to cause perforation of Secretary instruction perforations in index slip 23. Microphone handset 113 has a mode control button designated 116 with three positions designated Record-Listen-Review. A dictate bar 117 controls operations during the Record mode, including starting and stopping of belt 13, FIG. 1.

The circuit of FIG. 7 includes a transistor T11 arranged in a tuned oscillator circuit that is responsive to manipulation of the various buttons 115, 116, and 117 on handset 113 to generate predetermined tones that are transmitted to dictation apparatus 1 for effecting various operations of the apparatus. The circuits for only one of the stations 2 or 3 is shown in FIG. 7 and generally comprises all circuits to the left of the dashed line 120. The communication line 4, FIG. 1, is represented by three wires designated *4a*, *4b*, and *4c*, arranged between the dashed lines 120 and 121, FIG. 7. The components positioned to the right of dashed lines 121 are part of the circuits for dictation apparatus 1, FIG. 1, with additional control circuits according to the present invention shown in FIG. 8.

In order to dictate material and control the various operations of dictation apparatus 1, it is necessary for the remote station to first seize apparatus 1. The station represented in FIG. 7 has cradle switch contacts designated CS1 and CS2 that are positioned as shown in solid lines when the microphone rests in the cradle at the station. The cradle switch contacts CS1 and CS2 are transferred to the dashed positions shown in FIG. 7 when the associated microphone handset is lifted from its cradle.

For purposes of illustration it may be assumed that the circuits in FIG. 7 to the left of dash line 120 represents the circuits for remote station 2. Remote station 3, and additional remote stations in the system are then conneced to terminals 125, 126, and 127, FIG. 7.

It may further be assumed that dictation apparatus 1 is inactive and that station 2 wishes to gain access to apparatus 1. The dictator at station 2 lifts microphone handset 11, thereby transferring the cradle switches CS1 and CS2 from their normally closed to their transferred positions indicated by dashed lines in FIG. 7. As a result of the foregoing action, line 128 to terminal 125 is opened to prevent access of stations further down the line from station 2. A seizure and circuit interlock arrangement such as that disclosed in the Albanes et al. application, previously mentioned, can be used for preventing simultaneous access by two or more dictators in the system. With the transfer of cradle switch CS1, +V potential from terminal 129, is available to energize relay R, FIG. 7. With the energization of relay R, an R–1 contact, FIG. 7, closes to complete a holding circuit through cradle switch CS2. The holding circuit passes from terminal 129, through a relay designated P, through the primary winding of a transformer 130, by line *4b*, relay contact R–1, cradle switch CS2, the primary of a transformer 131, diode 132, and relay R. Besides providing a hold path for relay R, the foregoing circuit supplies operating potential for a tuned oscillator circuit including transistor T11, capacitors 135–139, and switch contacts 140–144 that are representative of switch contacts closed or opened by manipulation of control buttons 115, 116, and 117 on microphone handset 113. The operation of relay P opens the P–1 contact, FIG. 7, and removes energizing potential by line *4a* to all other stations in the system, thereby preventing other stations from gaining access to dictation apparatus 1.

The various modes of operation and actions required in dictation apparatus 1 are controlled by operation of of contacts 140–144 and the generation of tones from the tuned oscillator circuit, by way of transformers 130 and 131 to a combined audio and tone signal output terminal 148. The control tones from terminal 148 are applied by terminal 148 to a tone amplifier 149, FIG. 8, to selectively operate a plurality of tone discriminating circuits 150–154 and to selectively energize associated magnets 155–159. Magnets 155–159 are connected to an operating potential at terminal 160.

For purposes of illustration it may be assumed that the frequencies generated and recognized are as listed in the following table:

| Control Button | Switch Contact | Frequency | Tone Circuits Activated | Action Resulting |
|---|---|---|---|---|
| Button 115 moved to Secretary position. | Contact 143, FIG. 7, closed | 3.0 kc. | Circuit 150, FIG. 8 | Perforate Secretary perforation in index slip 23, FIG. 1. |
| Button 115 moved to Letter position. | Contact 142, FIG. 7, closed | 3.5 kc. | Circuit 151, FIG. 8 | Perforate End of Letter perforation in index slip 23, FIG. 1. |
| Button 116 moved to center Listen position. | Contact 141, FIG. 7, closed | 4.0 kc. | Clutch circuit 152, FIG. 8 | Belt 13, FIG. 1, is moved to reproduce signals previously recorded. |
| Button 116 moved to lower Review position. | Backspace contact 140 FIG. 7, opened. | 4.5 kc. | Clutch circuit 152 and Backspace circuit 153, FIG. 8. | Clutch is energized to move belt 13, FIG. 1, and Backspace magnet is energized to backspace magnetic head in relation to belt to review previously recorded information. |
| Button 116 in upper Record position and Dictate bar 117 depressed. | Contact 144, FIG. 7, closed | 5.0 kc. | Clutch circuit 152 and Record circuit 154, FIG. 8. | Clutch is activated to move belt 13, FIG. 1, and Record relay 159, FIG. 8, is activated to establish a Record mode of operation for recording audio signals on belt 13. |

It will be recalled in connection with the discussion of the basic tone to D.C. level discriminating circuits of FIGS. 3, 4, and 5*b*, that the circuits are inactive when a signal below a certain frequency is applied to their input terminals and are active when any signal above the predetermined frequency level is applied to their terminals. This action of the circuits is utilized in the discriminating circuit arrangements of FIG. 8. Also, the circuits of FIG. 8 rely on the gating and degating actions available in the circuit of FIG. 5*b*, as at terminals 104 and 105.

From the foregoing chart, it is seen that in some cases only a single tone circuit 150–154 is activated in response to a particular tone generated by closure of one of the contacts 140–144, FIG. 7, while under other circumstances, a plurality of the circuits 150–154 are activated in response to only a single generated tone signal. This is effected by interconnecting grating lines 162, 163, 164, and 165, FIG. 8. By appropriate direction of the output signals of those circuits responding to higher frequencies, circuits responding to lower frequencies as well as higher frequencies are gated or degated selectively, as circumstances require.

The normal procedure of the dictator at the remote station is to first record information on a magnetic media, such as magnetic belt 13, FIG. 1. He does this by moving mode control button 116 to the upper Record position, and depressing dictate bar 117, FIG. 6, thereby closing the switch contact 144, FIG. 7. Referring to the table, this results in the generation of a tone signal having a frequency of 5.0 kc. The tone together with audio speech signals derived from transducer 114, FIG. 7, is applied through transformer 131, cradle switch CS2, relay contact R–1, now closed, line 4*b*, transformer 130 primary, and transformer 130 secondary to the output terminal 148 at the central recording apparatus 1. The tone is amplified by amplifier 149, FIG. 8, and applied to all of the tone discriminating circuits 150–154 in parallel. With no gating networks provided, all of the circuits 150–154 would respond to the generated tone frequency of 5.0 kc., since this frequency exceeds the predetermined frequency level selected for each circuit. However, gating arrangements are provided by lines 162–165 in FIG. 8 to enable only the required circuits to remain active. Again referring to the table, the circuits that are active are the Clutch circuit 152 and the Record circuit 154, FIG. 8. Degating levels from circuit 152 by lines 163 and 164 prevent activation of the Instruction circuit 150 and End of Letter circuit 151. A degating level by line 165 from Record circuit 154 prevents activation of Backspace circuit 153. Therefore, with only the Clutch circuit 152 and Record circuit 154 activated, the apparatus 1 is placed in a Record mode for recording audio signals received from terminal 148 that are applied to an audio amplifier, not shown, and the clutch is energized to move belt 13, FIG. 1, in a forward direction to record the audio signals. Appropriate filtering networks can be provided in the system to prevent the recording of the tones in the range of 3.0 kc. to 5.0 kc. The audio speech signals would normally occupy the frequency range below 3.0 kc.

If, during the course of dictation, the dictator wishes to establish a different mode of operation or a different action at dictation apparatus 1, he does so by releasing the previously depressed buttons and by actuating other buttons on microphone handset 113, FIG. 6. Movement of the instruction button 115 to the lower Secretary position closes switch contact 143, FIG. 7, and causes a tone of 3.0 kc. to be generated over the line to tone amplifier 149. The Secretary index circuit 150 responds to any signal of 3.0 kc. or higher frequency while the other tone circuits 151–154 require frequencies of 3.5 kc. 4.0 kc., 4.5 kc., and 5.0 kc., respectively. Therefore, when instruction button 115 is moved as described, only circuit 150 responds to energize the Secretary perforation solenoid 155, FIG. 8.

Movement of the instruction button 115 to the upper Letter position effects generation of a tone of 3.5 kc. and energizes the end of letter solenoid 156, FIG. 8. Normally, the tone circuit 150 would also respond to the tone signal of 3.5 kc. but is degated by the appropriate degating level on line 162 from tone circuit 151.

In order to listen to previously dictated material, the dictator usually operates the mode button 116 to the lower Review position and thereby operates a backspace mechanism, described in the Albanes, et al, application, to move the magnetic head in dictation apparatus 1 one track toward the beginning of the dictated material. Button 116 is spring loaded to return from the Review to the Listen position, FIG. 6. While in the Review position, contact 141 is closed and contact 140 is opened by switch operator 133, FIG. 7, a tone signal of 4.5 kc. is generated, and tone circuit 153, FIG. 8, is activated to energize the backspace magnet 158.

The presence of the tone 4.5 kc. also activates Clutch circuit 152 since circuit 152 responds to a tone signal having a frequency of 4.0 kc. or above. As soon as operator pressure is removed from button 116, it returns to the center Listen position, FIG. 6, whereupon contact 141, FIG. 7, remains closed to generate a frequency of 4.0 kc. This continues the activation of Clutch circuit 152 to energize clutch magnet 157, but deactivates Backspace circuit 153. The dictator then listens to previously dictated material. If the dictator wishes to replace previously dictated material he restores the equipment to the Record mode of operation as previously described.

The logical D.C. level discriminating circuits just described can be arranged in a wide variety of control arrangements with the interconnecting and gating networks enabling the performance of various functions concurrently with other functions, or separately from other functions, as required in the application.

*Detailed description and operation-data communication system FIGURE 2*

FIG. 9*a* is a D.C. level to tone circuit and FIG. 10 is a tone to D.C. level circuit, both circuits being useful in a data transmission environment such as the system of FIG. 2. The D.C. level to tone circuit of FIG. 9*a* is representative of either of the block circuits designated 48 and 49 in FIG. 2. In either case, voltage or D.C. levels are applied to terminal 165, FIG. 9*a*, from the associated serializer 45 or 46 when operating in the transmit mode. The circuit of FIG. 9*a* includes transistors T12, T13, T14, T15, and T16 and is intended to supply one or two distinctive frequencies representative of "zero" or "one" bits of data at output terminal 166. The absence of data is indicated by a positive voltage level at terminal 165, such as +12.0 volts. The circuit comprises a multivibrator including transistors T13 and T15 that thereupon supply an alternating frequency signal output at terminal 166 at a relatively low frequency level, such as 1.0 kc. In order to supply a tone representative of a "one" bit of data, the input terminal 165 is brought to a ground or 0 D.C. level and the circuit of FIG. 9*a* then supplies a higher frequency output at terminal 166 in the range of for example, 1.5 kc.

Initially, the circuit of FIG. 9*a* is in an inactive condition due to a ground level applied to Carrier Control terminal 167 and to the base of transistor T14. A positive voltage level at terminal 167 turns Carrier on by bringing transistor T14 into conduction and initiating the multivibrating action of transistors T13 and T15. With no data control at terminal 165, the circuit will supply the 1.0 kc. output on terminal 166 for transmission to the receiving station and for recognition by the tone to D.C. level circuit, designated circuit D, in FIG. 10. The state of transistor T12, FIG. 9*a*, depends upon the D.C. level applied to terminal 165. Transistor T12 is normally off and responds to data bit signals that may be applied to terminal 165 at a typical rate of 200 to 500 bits per second.

With a positive D.C. level, representing no data, applied to terminal 165, transistor T12 is conducting with resulting current flowing through resistor 168. The current flowing through resistor 168 drops the potential at junction 169 and lessens the current flow through resistors 170 and 171. This establishes a longer time constant for capacitors 172 and 173 to discharge and establishes a low frequency output from terminal 166.

When a low or ground D.C. level is aplied to terminal 165, representing a data bit, transistor T12 is cut off. Less current flows through resistor 168 raising the potential applied to resistors 170 and 171 and increasing the time period of discharge for capacitors 172 and 173. This then establishes a higher rate of oscillation of the circuit and results in a 1.5 kc. tone at terminal 166. The output from transistor T15 through diodes 174, 175, and 176 to the base of transistor T16 is basically a square wave signal. A low pass filter comrpising resistor 177 and capacitor 178 tend to round the corners of the resulting signal at the collector of transistor T16 and change it to a more sinusoidal wave form. Typical signals having low and high frequency rates, respectively, are illustrated in FIGS. 9*b* and 9*c*.

Tone signals generated by the circuit of FIG. 9*a*, corresponding to circuits 48 and 49, FIG. 2, are transmitted to related circuits 51 and 50 that are like the circuit in FIG. 10. The circuit of FIG. 10 is a tone to D.C. level circuit, designated Circuit D, that uses the basic principles discussed in connection with FIGS. 3, 4, and 5*b*. In the circuit of FIG. 10 the components are comparable in many respects to the basic circuit discussed in FIG. 3. The circuit of FIG. 10 includes transistors T17, T18, T19, T20, T21, and T22. Transistor T17 tracks the input signal applied to terminal 180 in a manner comparable to transistor T1, FIG. 3. Supply voltages of +12.0 and −12.0 volts are provided in the circuit of FIG. 10 where indicated. The ultimate data representing output is provided by transistor T22 from output terminal 181. Transistor T18 is arranged to detect the absence of carrier on the line, that is, at terminal 180, or that the frequency of the carrier signal is too low, that is, in the assumed case, below 1.0 kc.

Transistor T19 provides an output control level on lines 182 and by way of diodes 183 and 184 to control transistor T22, thereby supplying data bit output manifestations at output terminal 181. The circuit of FIG. 10 is supplied with another output terminal 185 to give an indication that the carrier is absent, that the carrier is below the proper frequency range, or that the carrier is above the proper frequency range. In the assumed case the proper signal frequency range is assumed to be 1.0 kc. to 1.5 kc. with the 1.0 kc. representing "zero" bits and a 1.3 to 1.5 signal representing "one" bits.

Each of the transistors T18, T19, T20, and T21 is set at a predetermined discriminating level to respond to tone signals reflected through transistor T17 from terminal 180, each transistor responding to signal frequencies above a particular predetermined frequency level.

For purposes of illustration, transistor T18 responds to signals having a frequency of 1.0 kc. or above. Transistor T19 preferably responds to signal frequencies of 1.3 to 1.5 kc. or above. Transistor T20 responds to signals over 1.5 kc., such as 1.6 kc., or above. Transistor T21 is responsive to the condition of transistor T18 to supply a signal on terminal 185 to indicate the absence of carrier or that carrier is below a certain frequency level. If the circuit of FIG. 9*a* as represented by the corresponding circuits 48 or 49, FIG. 2, is supplying no carrier or a carrier signal below 1.0 kc., none of the transistors T18, T19, or T20 conducts. With transistor T18 cut off, the potential at terminal 186 is sufficient to turn transistor T21 on. This drops the potential at terminal 185 from a positive level to ground, for example, to indicate the absence of carrier or that carrier is below 1.0 kc. A proper 1.0 kc. signal coming in at terminal 180 results in the turn on of transistor T18, thereby dropping the potential at terminal 186 and cutting off transistor T21. This raises the potential at terminal 185 to a more positive level and indicates that carrier in the proper frequency range, that is, 1.0 kc., is again being received.

With a 1.0 kc. signal at terminal 180, transistor T19 will be off. The potential at the collector of transistor T19 and on line 182 to the base of transistor T22 is at such a level that transistor T22 is conductive and the output at terminal 181 is at a ground level, thereby representing a "zero" data bit. When a signal between approximately 1.3 kc. and 1.5 kc. is received at terminal 180, transistor T19 becomes conductive, thereby dropping the potential at the collector of T19, changing the biasing potential on the base of transistor T22 to cut T22 off, and supplying a +12 volt output at terminal 181, thereby indicating the presence of a "one" data bit.

If the incoming signal to terminal 180 rises above 1.5 kc., to a level of, for example, 1.7 kc., both transistors T18 and T19 will be on, but transistor T20 is set to respond at frequencies above the desired range of 1.5 kc. and will also become conductive. The conduction of transistor T20 drops the potential at terminal 185, thereby giving an indication that carrier has risen above the desired maximum level. The switching on of transistor T20 overrides the control exerted by transistor T21 which is off at this time since transistor T18 is on.

The dropping of the potential at terminal 185 exerts control through diode 187 and diodes 183 and 184 to hold transistor T22 in its on condition, thereby insuring that only a "zero" indication is provided at terminal 181 and that no significant signal is available during this time.

The circuit arrangements of FIGS. 9*a*, and 10 rely on the general logical tone principles disclosed in connection with the basic circuits of FIGS. 3, 4, and 5*b*, and further expand these principles to insure that received tone signals stay within a particular predetermined range of frequencies in order for the system to be responsive. Should the signals drop below the predetermined range or rise above the predetermined range, appropriate indications are provided.

The principles of tone logic described herein offer a number of important advantages. For example, the circuits of the type disclosed can be readily fabricated in numerous forms of standardized circuit packaging, including minaturized circuits. It is not necessary to stock a wide range of circuits to handle each type of tone signals that may be encountered, since the standardized circuit arrangements of the present invention lend themselves readily to a wide variety of tone response situations. Also, due to the logical nature of the various circuits, a plurality of diverse functions can be controlled and rendered active in a selective manner either alone or in combination with other functions, as required. Additionally, tone response can be exerted by applying incoming tone signals to all circuits in parallel with selective activation controlled by gating interconnections and feedback loops. As discussed in connection with the communicating aspects, even tighter control of tone response is possible by providing basic circuits responsive to frequencies within a certain predetermined range, and other basic circuits that supply indications when the frequencies encountered fall outside the predetermined range.

Numerous applications for the disclosed logical principles can be derived from the exemplary embodiments discussed herein. Both the control signal and data transmission aspects can be combined in the same environment if desired.

While the invention has been particularly shown and described with reference to several embodiments, it will be understood by those skilled in the art that various changes in form and detail may be made without departing from the spirit and scope of the invention.

What is claimed is:

1. A signal control arrangement, comprising:

apparatus having a plurality of actions;

a predetermined number of logical signal circuits, said circuits being associated with said actions and each of said circuits being normally responsive to all alternating signals at or above a respective particular frequency level to produce an output for action control;

means for selectively generating a plurality of signals, each of said signals having a frequency at or above one of said respective particular levels that is recognizable by all circuits responding to signals at or above said one respective particular level;

and gating networks associated with said logical signal circuits and responsive to output signals from said logical circuits when they respond to a signal to selectively gate or degate other logical circuits normally responding to the same signal.

2. A signal control arrangement according to claim 1, wherein:

said generating means comprises D.C. to tone converting circuits for generating a plurality of audible tone signals, each having a respective different frequency, and wherein said logical signal circuits each responds to tone signals at or above a respective different frequency level to provide D.C. outputs for controlling said actions.

3. The signal control arrangement according to claim 1, further comprising:

a communicating network for transmitting generated signals to said logical signal circuits.

4. A signal control arrangement according to claim 1, wherein:

each of said logical signal circuits comprises components that establish a unique time constant response to applied signals so that each of said logical signal circuits responds to frequencies at or above said respective frequency levels, and wherein said gating networks comprise diode gating circuits respectively associated with each of said logical signal circuits, and circuit interconnections selectively arranged for interconnecting outputs of particular ones of said logical signal circuits with other logical signal circuits to be controlled.

5. A signal control arrangement according to claim 1, wherein:

said logical signal circuits are arranged in a sequential order, with each of said circuits responding to applied signals at respective levels differing according to frequency from lowest to highest, and wherein said gating networks comprise interconnections from the outputs of logical signal circuits responding to higher frequency levels to gate or degate logical signal circuits responding to signals at or above respectively lower frequency levels, as required.

6. A signal control arrangement according to claim 1, wherein:

said apparatus comprises a dictation apparatus having a predetermined number of actions, such as modes of operation, indexing operations, backspacing operations, and start-stop operations, and wherein said signal generating means comprises an operator controlled device responsive to operator manipulation to generate said respective signal frequencies in order to thereby effect control of said dictation apparatus.

7. A signal control arrangement according to claim 6, wherein:

said manipulated device is a microphone handset having control buttons and associated switches for effecting generation of said respective signals.

8. A signal control arrangement according to claim 3, wherein:

said apparatus comprises a centrally located dictation apparatus, and wherein said signal generating means comprises a plurality of remote dictator stations interconnected with said dictation apparatus on a selective basis by way of said communication network.

9. A signal control arrangement according to claim 6, further comprising:

a plurality of electromagnetically energizable devices for effecting the actions required in said dictation apparatus, each of said devices being associated with a respective one of said logical signal circuits.

10. A signal control arrangement according to claim 7, wherein:

said signal generating means comprises a tuned oscillator circuit for generating respectively different tone signals under control of said handset switches as they are manipulated.

11. A signal control arrangement according to claim 4, further comprising:

a tone amplifier for amplifying and directing generated tone signals to said logical signal circuits, and wherein each of said logical signal circuits comprises a first transistor portion for tracking applied signals, a resistor-capacitor time constant network respectively responsive to different frequency levels, and a further transistor portion for supplying D.C. logical outputs under control of said time constant portion.

12. A signal discriminating arrangement, comprising:

apparatus having a plurality of actions and facilities for processing data intelligence;

means for selectively generating a plurality of signals, each of said signals having a frequency at or above a respective different level, and said generating means being further responsive to signals from a data source for generating signals at a particular frequency level representing the absence of a data bit or at a particular different frequency level representing the presence of a data bit;

a plurality of logical signal circuits, said signal circuits being associated with said actions and each of said signal circuits being normally responsive to all signals at or above a respective particular frequency level to produce an output for action control;

gating networks associated with said logical signal circuits and responsive to output signals from said logical signal circuits when they respond to a signal to selectively gate or degate other logical circuits normally responding to the same signal;

and an additional logical signal circuit responsive to the data representing signals to provide output indications signifying the absence and presence of data bits, respectively.

13. A signal discriminating arrangement according to claim 12, further comprising:

signal monitoring means associated with said data responsive logical signal circuit for supplying a monitoring indication when (1) no signal is generated by said signal generating means, and (2) a signal is generated having a frequency lower or higher than said data representing frequency levels.

14. A data transmission arrangement, comprising:

a source of signals representing data bits;

means responsive to signals from said source for generating an alternating signal at a particular first frequency level representing the absence of a data bit and another alternating signal at a particular different second frequency level representing the presence of a data bit;

a logical signal circuit responsive to said first frequency signals and said second frequency signals to provide output indications signifying the absence and presence of data bits, respectively;

and signal monitoring means associated with said logical signal circuit for supplying a monitoring indication when (1) no signal is generated by said signal generating means, and (2) a signal is generated having a frequency lower or higher than said particular frequency level or said different frequency level.

15. A data transmission arrangement according to claim 14, wherein:

said source of data bits and said signal generating means comprise a first communication terminal, and said logical signal circuit and said signal monitoring means comprise a second communication terminal, and further comprising a communication network interconnecting said terminals.

16. A data transmission arrangement according to claim 15, wherein:

said first and second communication terminals comprise printing apparatus, wherein duplicate arrangements of signal generating means, logical signal circuits, and signal monitoring means are provided for two-way data transmission between said terminals, and wherein each of said terminals is responsive to output indications from a respectively associated logical signal circuit to print characters represented by said output indications in coded form.

17. A data transmission arrangement according to claim 14, further comprising:

a printing apparatus responsive to output indications from said logical signal circuit for printing characters.

18. A data transmission arrangement according to claim 14, wherein:

said logical signal circuit comprises a transistor portion responsive to said different frequency signals to provide D.C. logical output levels, and wherein said signal monitoring means comprises an additional transistor circuit portion for recognizing absence of signals and signals outside the range covered by said data representing frequencies.

19. A data transmission arrangement according to claim 14, wherein:

said logical signal circuit and said signal monitoring means comprise a transistor circuit having a plurality of transistors, each responsive to applied signals at or above a respectively different frequency level to supply data bit representations, signal absence representations, and indications of signals other than said data representing signals, and wherein a gating network is provided for selectively interconnecting outputs from said respective portions to control other operations of said circuit, as required, for obtaining data manifestations, and signal monitoring manifestations.

20. Apparatus according to claim 14 wherein:

said logical signal circuit comprises a first capacitor;

a constant voltage source connected to said first capacitor for charging the same at a predetermined rate;

a discharge circuit for said first capacitor;

said discharge circuit comprising a second capacitor and a bistable switch connected in series relation;

means to supply said alternating signals to said switch for actuating said switch to alternately open and close said discharge circuit at the frequency of the alternating signal supplied to said switch with said first capacitor discharging when said switch is closed.

21. A frequency discriminating circuit comprising:

a first capacitor;

a constant voltage source connected to said first capacitor for charging the same at a predetermined rate;

a discharge circuit for said first capacitor;

said discharge circuit comprising a second capacitor and a bistable switch connected in series relation;

a source of a variable frequency input signal coupled to said switch for actuating said switch to alternately open and close said discharge circuit at the frequency of the input signal with said first capacitor discharging when said switch is closed;

a bistable output switch; and circuit means interconnecting said first capacitor with said bistable output switch for actuating the latter when the voltage on said first capacitor exceeds a predetermined threshold level.

22. A frequency discriminating circuit according to claim 21 wherein:

said bistable switch comprises a transistor having a base, an emitter and a collector;

said emitter and collector being connected in series relation with said second capacitor; and said variable frequency input signals being supplied to said base of said transistor.

23. A frequency discriminating circuit according to claim 22 wherein:

said bistable output switch comprises a second transistor having a base, an emitter and a collector;

said constant voltage charging source comprising a source and a resistive load connected in series with said first capacitor; and said circuit means interconnecting comprising a conductor extending from a point in said constant voltage charging source between said resistive load and said first capacitor to said base of said second transistor.

References Cited

UNITED STATES PATENTS

| | | | |
|---|---|---|---|
| 2,684,996 | 7/1954 | Potts | 179—2 |
| 3,046,338 | 7/1962 | Higham | 179—2 |
| 3,317,670 | 5/1967 | Doktor | 178—88 |

ROBERT L. GRIFFIN, *Primary Examiner.*

J. T. STRATMAN, *Assistant Examiner.*